Dec. 8, 1942. H. L. DIXON 2,304,554
METHOD OF SEPARATING SCRAPPED VULCANIZED RUBBER
Filed Sept. 21, 1940
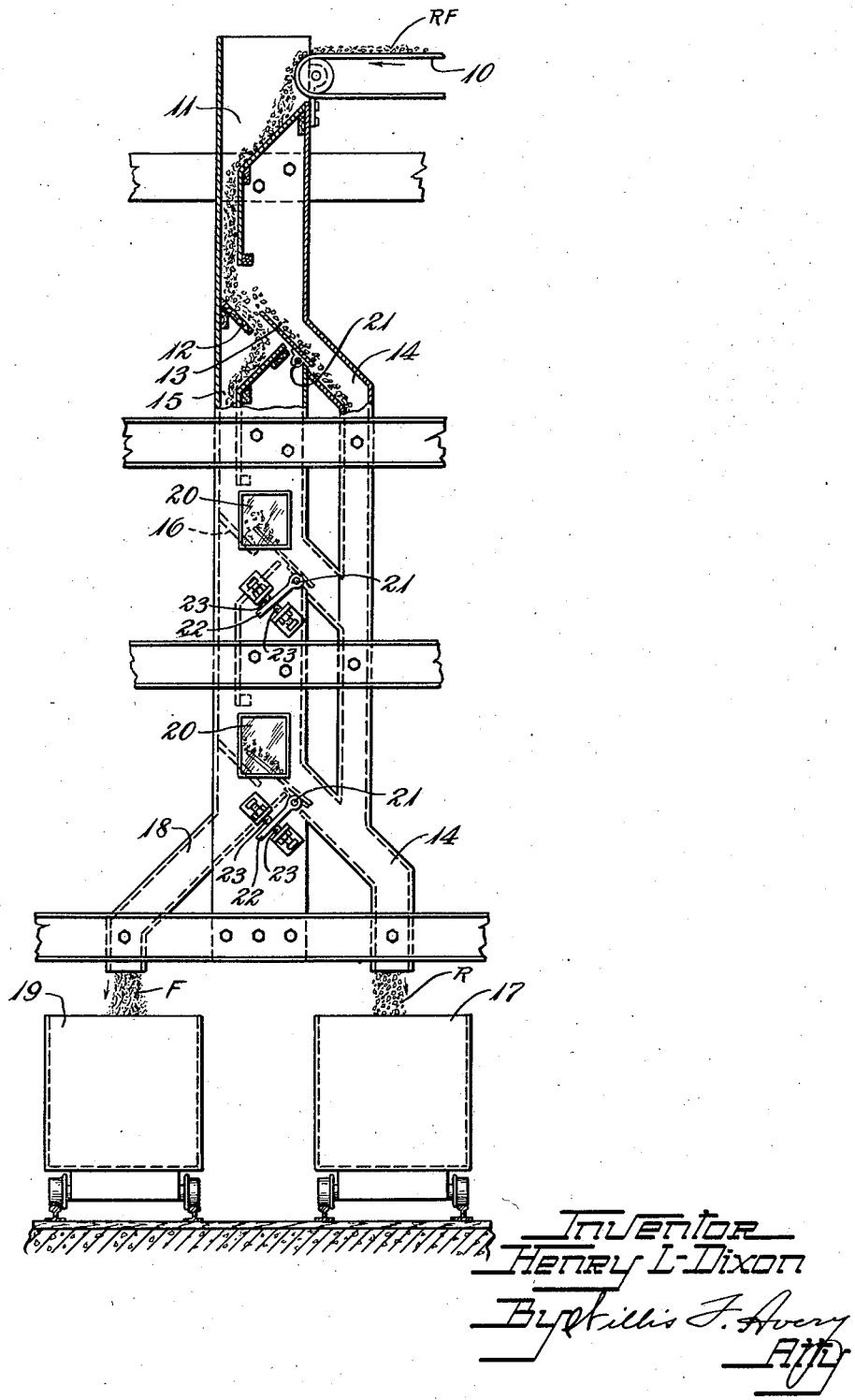
INVENTOR
Henry L. Dixon
By Willis F. Avery
ATTY Patented Dec. 8, 1942

2,304,554

UNITED STATES PATENT OFFICE 2,304,554

METHOD OF SEPARATING SCRAPPED VULCANIZED RUBBER

Henry L. Dixon, Akron, Ohio, assignor to The B. F. Goodrich Company, New York, N. Y., a corporation of New York Application September 21, 1940, Serial No. 357,702

2 Claims. (Cl. 209—119)

This invention relates to a method of separating resilient and less resilient materials, particularly finely-divided rubber and fiber mixtures and to the apparatus employed therein.

It is the object of this invention to present a method of separating resilient and less resilient materials efficiently and economically. In many manufacturing processes there are produced mixtures of finely-divided resilient and less resilient materials and their separation is oftentimes difficult. This is particularly true in reclaiming rubber where such vulcanized rubber articles as tires, boots and shoes, hose, and the like are ground before the rubber is reclaimed. This grinding produces a mixture of rubber and fiber which, for best results, should be separated before the rubber is reclaimed.

I have invented a method of separating a finely-divided mixture of resilient and less resilient materials into its component fractions through the employment of apparatus that takes advantage of the differences in resiliency of the individual particles in the mixture. Generally the method of this invention comprises projecting the mixed materials, such as rubber and fiber, along a definite path and then abruptly changing the direction of the flow by interposing an angularly disposed rigid surface in the path of the mixture. The differences in resiliency of the materials causes them to be separated as they strike the surface and these fractions are then collected. A practical embodiment of this invention employs an apparatus comprising one or more smooth, rigid surfaces used as bounce boards and placed on an angle with the horizontal. Each of these bounce boards has a receiving board just above and parallel to it but with the upper end of the bounce board left uncovered so as to provide an area from which the resilient particles may bounce. The material to be separated is dropped from a height onto the upper open end of the bounce board. The more resilient particles bounce from the board up and onto the receiving board while the less resilient particles slide down the bounce board without appreciable bouncing. If more than one such bounce board and receiving board unit is used, the units are arranged in series with the fraction of less resilient material sliding off one bounce board and falling onto the next. Thus increments of the resilient material are progressively removed.

This invention can best be understood by reference to the enclosed drawing showing an elevation, partially broken away and sectioned for clarity of illustration, of apparatus including a series of bounce boards for separating ground rubber from fiber.

The ground scrap containing rubber and fiber indicated at RF, is carried from the grinder on a belt 10 where it falls into a chute 11 and then onto the first bounce board 12. Particles of rubber bounce from the board 12 onto a receiving board 13 and into an exit chute 14. The fiber containing some rubber falls off the bounce board 12, through another chute 15 onto the second bounce board 16 where more of the rubber is separated. This continues over a third bounce board until practically all the rubber is separated from the fiber. The rubber R falls out through one exit 14 into a receiver 17 and the fiber F falls through another exit 18 into another receiver 19. In the apparatus illustrated, three bounce boards are used but any number can be employed dependent upon the material to be separated and the degree of separation desired.

Glass windows 20 are placed in the housing of the apparatus opposite each bounce board for observation purposes. The receiving boards are hinged as indicated at 21 and may be set any distance desired from the bounce board by means of arms 22 and set screws 23. The greater the distance between the bounce boards and the receiving boards, the smaller the amount of fiber in the rubber and the sharper the separation. When rubber tires are ground to four mesh size the distance of drop to the bounce board should be about five feet for optimum separation and the receiving board should be about 22 inches above the bounce board. These figures are given merely as examples, however, as the actual condition of the material, its size, the type of material, and the degree of separation desired all effect the dimensions of the apparatus as well as the number of bounce boards used in series in the apparatus. The dimensions of the structure may be varied as indicated and are dictated by the characteristics of the materials to be separated.

Having disclosed a practical embodiment of this invention it is recognized that the invention is not to be limited to any particular kind of material to be separated, to any particular material of construction for the apparatus used in the invention, or to any certain dimensions in the structure but that the invention shall be applied broadly within the spirit and scope of the appended claims.

I claim:

1. In the reclaiming of scrapped vulcanized rubber articles, such as pneumatic tires, which contain fibrous material in admixture with the vulcanized rubber portions of the articles by a process in which the articles are ground to a fairly fine condition and the ground scrap then is subjected to an operation for separating a rubber-rich component for subsequent treatment in a plasticizing operation, the method which comprises effecting such separation of the ground scrap into its components by dropping the mixture, while it is in a dry condition and while the rubber is in a resilient, vulcanized, and unplasticized condition, onto a rigid surface inclined at a relatively steep angle whereby the fiber-rich components slide off readily without substantial bouncing while the rubber-rich components bounce off at an angle, and selectively collecting the rubber-rich components which bounce more than a pre-determined distance from the said surface.

2. In the reclaiming of scrapped vulcanized rubber articles, such as pneumatic tires, which contain fibrous material in admixture with the vulcanized rubber portions of the articles by a process in which the articles are ground to a fairly fine condition and the ground scrap then is subjected to an operation for separating a rubber-rich component for subsequent treatment in a plasticizing operation, the method which comprises effecting such separation of the ground scrap into its components by dropping the mixture, while it is in a dry condition and while the rubber is in a resilient, vulcanized and unplasticized condition, onto a rigid surface inclined at a relatively steep angle whereby the fiber-rich components slide off readily without substantial bouncing while the rubber-rich components bounce off at an angle, selectively collecting the rubber-rich components which bounce onto a receiving member positioned a pre-determined distance from the said surface, and subjecting the fiber-rich component to a repeated treatment of the same character to remove additional rubber-rich material.

HENRY L. DIXON.